United States Patent
Thornburgh et al.

(10) Patent No.: US 10,116,718 B2
(45) Date of Patent: Oct. 30, 2018

(54) DIGITAL CONTENT STREAMING TO LOSS INTOLERANT STREAMING CLIENTS

(71) Applicant: Adobe Systems Incorporated, San Jose, CA (US)

(72) Inventors: Michael Christopher Thornburgh, San Jose, CA (US); Kevin Michael Streeter, San Bruno, CA (US)

(73) Assignee: Adobe Systems Incorporated, San Jose, CA (US)

( * ) Notice: Subject to any disclaimer, the term of this patent is extended or adjusted under 35 U.S.C. 154(b) by 311 days.

(21) Appl. No.: 15/070,916

(22) Filed: Mar. 15, 2016

(65) Prior Publication Data

US 2017/0272483 A1    Sep. 21, 2017

(51) Int. Cl.
| | | |
|---|---|---|
| G06F 15/177 | (2006.01) | |
| H04L 29/06 | (2006.01) | |
| H04L 12/26 | (2006.01) | |
| H04L 29/08 | (2006.01) | |
| H04L 1/00 | (2006.01) | |

(52) U.S. Cl.
CPC .............. *H04L 65/601* (2013.01); *H04L 1/00* (2013.01); *H04L 43/0829* (2013.01); *H04L 67/02* (2013.01)

(58) Field of Classification Search
USPC ................................... 709/220, 224; 724/91
See application file for complete search history.

(56) References Cited

U.S. PATENT DOCUMENTS

| | | | | |
|---|---|---|---|---|
| 7,072,984 B1 * | 7/2006 | Polonsky | .......... | G06F 17/30905 707/E17.121 |
| 8,533,324 B2 * | 9/2013 | Westphal | .......... | G06F 17/30873 709/224 |
| 9,009,764 B2 * | 4/2015 | Walker | ............. | H04N 21/44204 725/91 |
| 9,246,971 B2 * | 1/2016 | Giladi | .................... | H04L 65/605 |
| 9,531,780 B2 * | 12/2016 | Leong | .................... | H03M 13/23 |
| 9,706,443 B2 * | 7/2017 | Oyman | ............. | H04W 74/0833 |
| 9,774,465 B2 * | 9/2017 | Oyman | ................. | H04L 12/189 |
| 9,866,459 B1 * | 1/2018 | Joliveau | ............. | H04L 43/0823 |
| 2012/0174163 A1 | 7/2012 | Moorthy et al. | | |

FOREIGN PATENT DOCUMENTS

WO    WO-2014035645    3/2014

OTHER PUBLICATIONS

"Combined Search and Examination Report", GB Application No. 1619839.3, dated Apr. 27, 2017, 6 pages.

* cited by examiner

*Primary Examiner* — Tammy Nguyen
(74) *Attorney, Agent, or Firm* — Wolfe-SBMC (57) ABSTRACT

Digital streaming to loss intolerant clients is described. In one example, a system includes a repair module to repair an error in the stream of digital content having a plurality of packets configured according to a loss tolerant format. The system also includes a segment formation module to form the plurality of packets into a plurality of segments in a media presentation and a manifest module to configure a manifest file mapping time periods to respective segments of the plurality of segments within the media presentation. The system further includes a streaming server to provide the manifest file to a hypertext transfer protocol (HTTP) streaming client and form a response to the HTTP streaming client including at least one of the plurality of segments as requested by the HTTP streaming client based on the manifest file.

20 Claims, 6 Drawing Sheets

DIGITAL CONTENT STREAMING TO LOSS INTOLERANT STREAMING CLIENTS

BACKGROUND

Communication of streaming digital content becomes increasingly complicated as a number of recipients that receive the content increases, such as in one-to-many unidirectional transmission mediums used by cable providers, satellite transmitters, and so on. For example, conventional recovery techniques employ backchannel communication back to a distributor of the stream to request retransmission of portions of the stream of digital content. While these conventional recovery techniques may be feasible for low numbers of streaming clients, this is no longer feasible for the vast number of streaming clients of cable providers and satellite transmitters.

This becomes further complicated in situations in which the streaming clients are not loss tolerant. For example, some streaming clients may no longer operate when confronted with errors in a stream of the digital content, such as missing or corrupted segments caused during communication. An example of such a loss intolerant client includes hypertext transfer protocol (HTTP) clients. Accordingly, this may make traditional streaming techniques inoperable for these clients and prevent use of conventional one-to-many unidirectional transmission streaming techniques.

SUMMARY

Digital streaming to loss intolerant clients is described. In one example, a system includes a repair module to repair an error in the stream of digital content having a plurality of packets configured according to a loss tolerant format. The system also includes a segment formation module to form the plurality of packets into a plurality of segments in a media presentation and a manifest module to configure a manifest file mapping time periods to respective segments of the plurality of segments within the media presentation. The system further includes a streaming server to provide the manifest file to a hypertext transfer protocol (HTTP) streaming client and form a response to the HTTP streaming client including at least one of the plurality of segments as requested by the HTTP streaming client based on the manifest file.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

As the prevalence of hypertext transfer protocol (HTTP) streaming clients has increased, content distributors, such as satellite broadcasters, cable providers, and so on, wish to directly transmit live streaming digital content (e.g., video) to these clients in order to expand a range of potential customers of this content. HTTP streaming clients may be configured in a variety of ways, such as dedicated applications, plug-in modules, and so on to render the digital content being streamed. Examples of HTTP streaming techniques include Apple® HLS and MPEG-DASH. Thus, an ability to directly stream digital content to these clients would greatly increase a number of customers that are available to the content distributors.

HTTP streaming is typically performed by splitting the digital content into segments, of a few seconds apiece, which are downloaded by the clients in a sequence from an HTTP server using a request/response technique. However, these clients are typically loss intolerant and thus require that the segments are correct and free of errors. For example, HTTP streaming clients may become unstable or cease rendering the content if one or more segments of the digital content is corrupted or missing, e.g., due to communication failure. Because of this, conventional techniques to stream digital content are not usable by conventional content distributors to directly transmit live streaming digital content to these loss intolerant clients.

Digital content streaming techniques usable by loss intolerant clients are described. In one example, a content distribution system (e.g., cable provider, satellite transmitter) streams digital content to client devices over a network using a loss tolerant protocol, such as an MPEG-2 Transport Stream. This may be performed as a one-to-many unidirectional transmission to the client devices.

The client devices include a transforming module to convert the stream of content from the loss tolerant format to a format that is consumable by loss intolerant streaming clients of the client devices, e.g., HTTP streaming clients. Because a brief error may render HTTP streaming clients inoperable, the client devices also include a repair module that is configured to repair errors encountered in the loss tolerant stream of content, e.g., through padding, null packets or frames (i.e., "blank"), and so on. Once repaired, the transforming module forms segments in the format that is consumable by the loss intolerant streaming clients and a manifest file (i.e., manifest) that maps time periods to respective segments.

The manifest file and the segments are then provided to a streaming server of the client device to provide segments, as desired, to loss intolerant streaming clients of the client device. Accordingly, the loss intolerant streaming clients may obtain segments from the streaming server using a request/response technique. As such, the loss intolerant streaming clients may do so without being aware that digital content of the segments was communicated using a different format and without being rendered inoperable due to errors potentially encountered during the communication. In this way, loss intolerant clients may be used to consume a greater variety of content from a greater variety of sources. Further discussion of these and other examples is included in the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
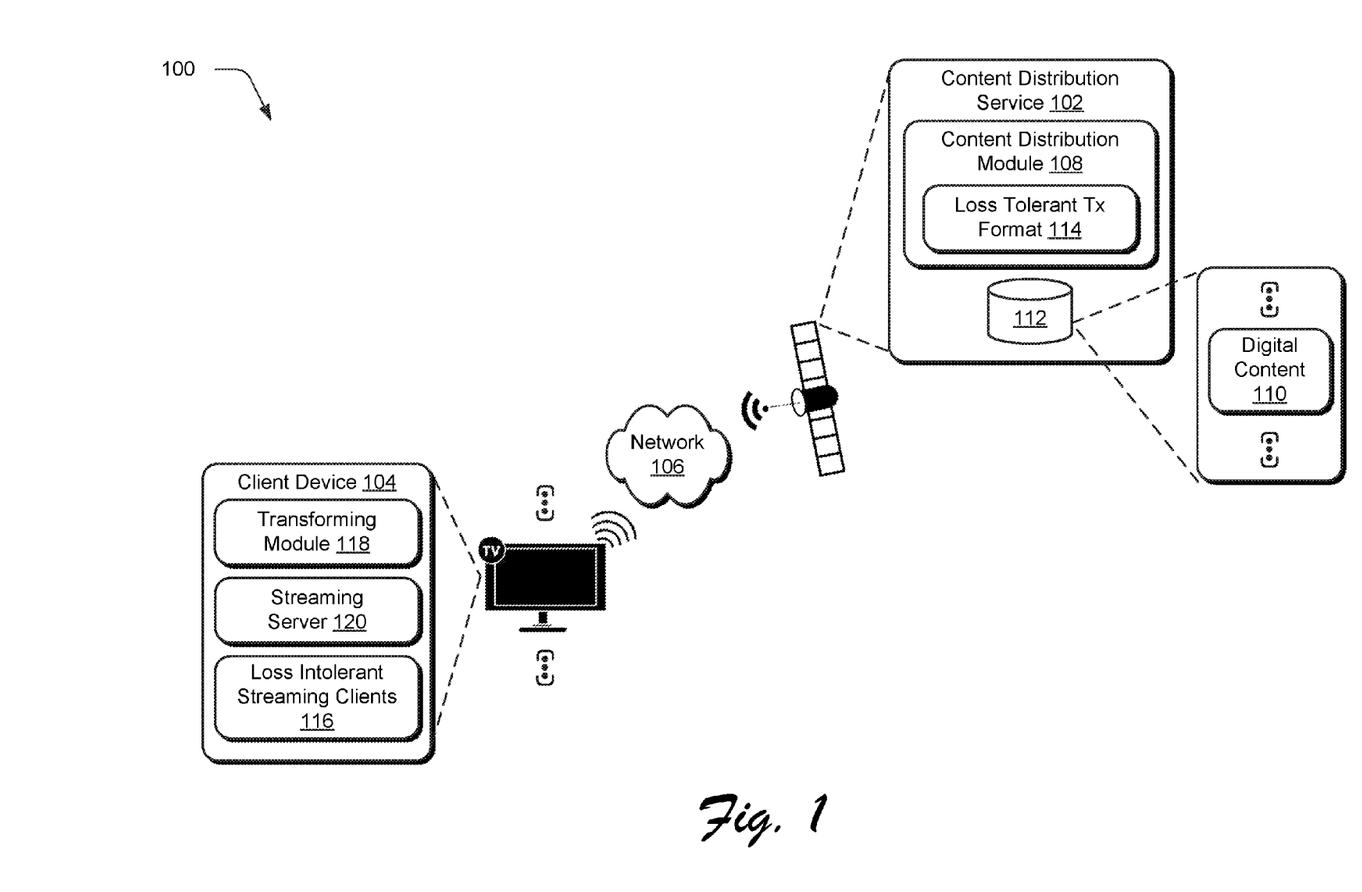
FIG. 1 is an illustration of an environment in an example implementation that is operable to employ digital content streaming techniques described herein.

FIG. 1 is an illustration of an environment 100 in an example implementation that is operable to employ digital content streaming techniques described herein. The illustrated environment 100 includes a content distribution service 102 that is communicatively coupled to a plurality of client devices, an example of which is illustrated as client device 104, via a network 106. The content distribution service 102 is configurable in a variety of ways, such as a satellite provider, terrestrial cable provider, or any other distributor using a one-to-many unidirectional transmission medium.

Figure 6:
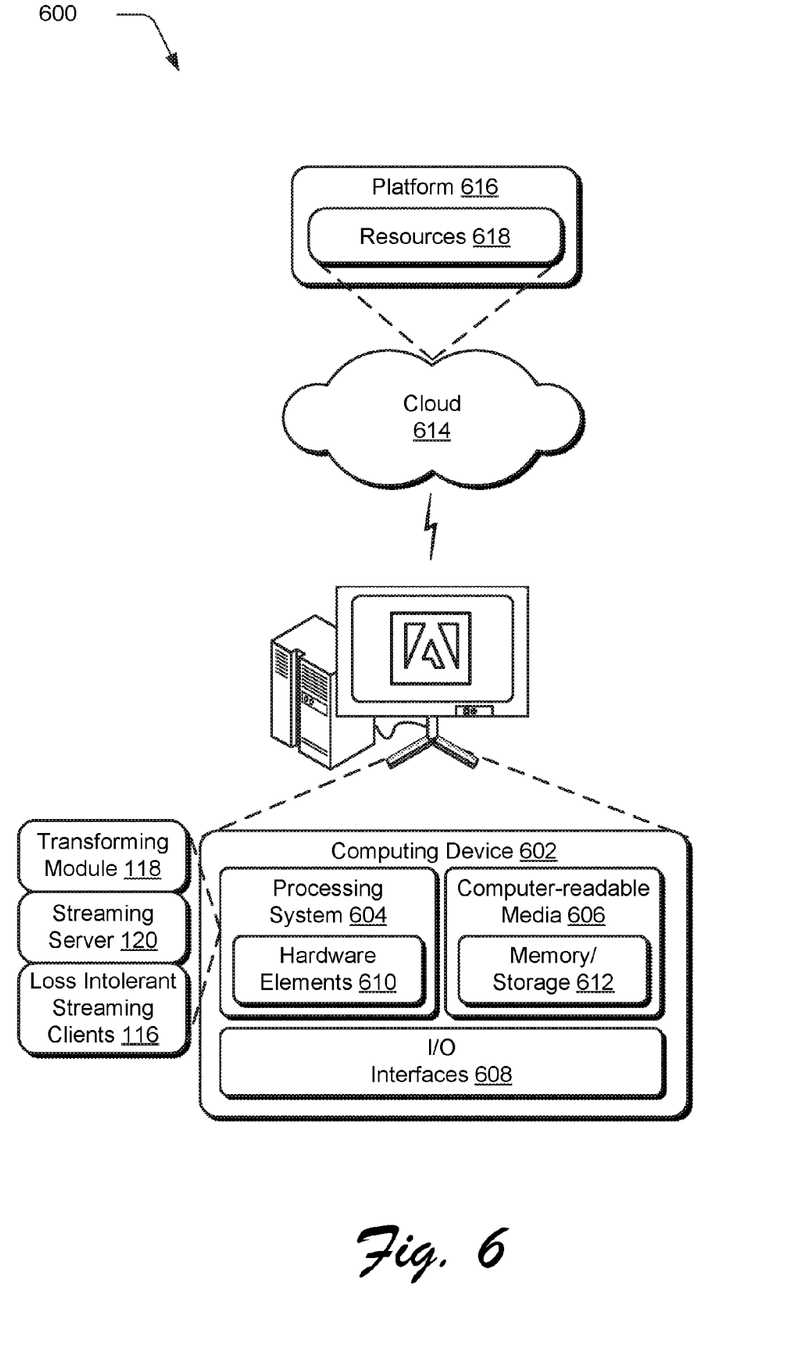
FIG. 6 illustrates an example system including various components of an example device that can be implemented as any type of computing device as described and/or utilize with reference to FIGS. 1-5 to implement embodiments of the techniques described herein.

The client device 104 is also configurable using a variety of computing devices as further described in relation to FIG. 6. A computing device, for instance, may be configured as a desktop computer, a laptop computer, a mobile device (e.g., assuming a handheld configuration such as a tablet or mobile phone as illustrated), and so forth. Thus, the computing device may range from full resource devices with substantial memory and processor resources (e.g., personal computers, game consoles) to a low-resource device with limited memory and/or processing resources (e.g., mobile devices) that is configured to communicate via the network 106. Additionally, a client device 104 may be implemented using a plurality of different devices, e.g., multiple servers.

The content distribution service 102 includes a content distribution module 108 that is implemented at least partially in hardware to control streaming of digital content 110 via the network 106, which is illustrated as stored in storage 112. Digital content 110 may take a variety of forms, such as media, video, audio, and so forth.

The content distribution module 108 is configured to stream the digital content 110 via the network 106 as packets to the client device 104. To do so, the content distribution module 108 uses a loss tolerant transmission (TX) format 114, e.g., MPEG-2 Transport Stream. MPEG-2 Transport Stream is loss tolerant through use of resynchronization markers ("syncwords"), frame boundary markings, and other encoding features, usable to resume decoding the transport stream after a period of lost or corrupted packets. In this way, the content distribution service 102 employs a one-to-many unidirectional transmission without use of a backchannel, e.g., to reply to requests to resend individual packets that are missing or corrupted which are not feasible or desirable in a one-to-many setup for cable and satellite providers.

As previously described, however, the client device 104 may include loss intolerant streaming clients 116 that are rendered inoperable when confronted with communication errors. For example, missing or corrupted packets may cause the loss intolerant streaming clients 116 to cease rendering of the content.

As part of conventional recovery, error correcting codes (ECCs) are used at a transmission level and not in the form that the loss intolerant HTTP streaming clients typically consume. The ECCs include redundant data that is usable to recover lost or corrupted packets. The issue with ECC is that the loss intolerant clients 116 are intolerant to any loss, whereas ECC is configured to correct a finite amount of loss. Although ECC can be increased to correct for increasingly greater amounts of potential loss, this is wasteful in the normal case of low amounts of loss due to additional resources used to support this increase in redundant data. Additionally, at some point there may be more loss than there is ECC to correct, at which loss intolerant clients 116 might become inoperative. Accordingly, use of the loss intolerant streaming clients 116 is challenged by economics/budgeting, in the domain of providing enough ECC to recover from potential errors versus the cost (e.g., in bandwidth/available channel capacity) to send the ECC versus how much of that bandwidth is typically wasted. Since any error may render the loss intolerant streaming clients 116 inoperable, this invariably leads to use of excessive amounts of ECC.

Accordingly, the client device 104 includes a transforming module 118 and a streaming server 120 that are configured to provide the stream of the digital content 110 to the loss intolerant streaming clients 116 in a format that is consumable by the loss intolerant streaming clients 116. Therefore, the techniques described are performable without an increase in cost to the ECC in bandwidth and available channel capacity. Examples of loss intolerant streaming clients 116 include applications, plug-in modules, and so on that are configured as hypertext transfer protocol (HTTP) clients, e.g., in accordance with MPEG-DASH, Apple® HLS, and so on.

The transforming module 118 is configured to receive a stream of the digital content 110 in the loss tolerant transmission format 114 and transform this content into a format consumable by the loss intolerant streaming clients. As part of this, the transforming module 110 may repair errors, such as missing or corrupted packets caused by communication over the network 106 in a manner that is usable to maintain consistent playback, such as through use of heuristics as further described in the following in relation to FIGS. 4-5. The digital content 110, once transformed, is then provided to a streaming server 120 to stream the digital content 110 "as expected" by the loss intolerant streaming clients 116.

The streaming server 120, for instance, may receive the digital content 110 as a media presentation including a plurality of segments and a manifest file that maps time periods to respective segments in the media presentation. The loss intolerant streaming clients 116 may then follow a request/response technique in which the loss intolerant streaming clients 116 request particular segments from the streaming server 120 for rendering based on the manifest file and receives responses that include those segments from the server. In this way, the loss intolerant streaming clients 116 are able to access segments of the digital content 110 without being confronted with errors that could cause the streaming clients to be rendered inoperable. Further discussion of this is included in the following and shown in corresponding figures.

Figure 2:
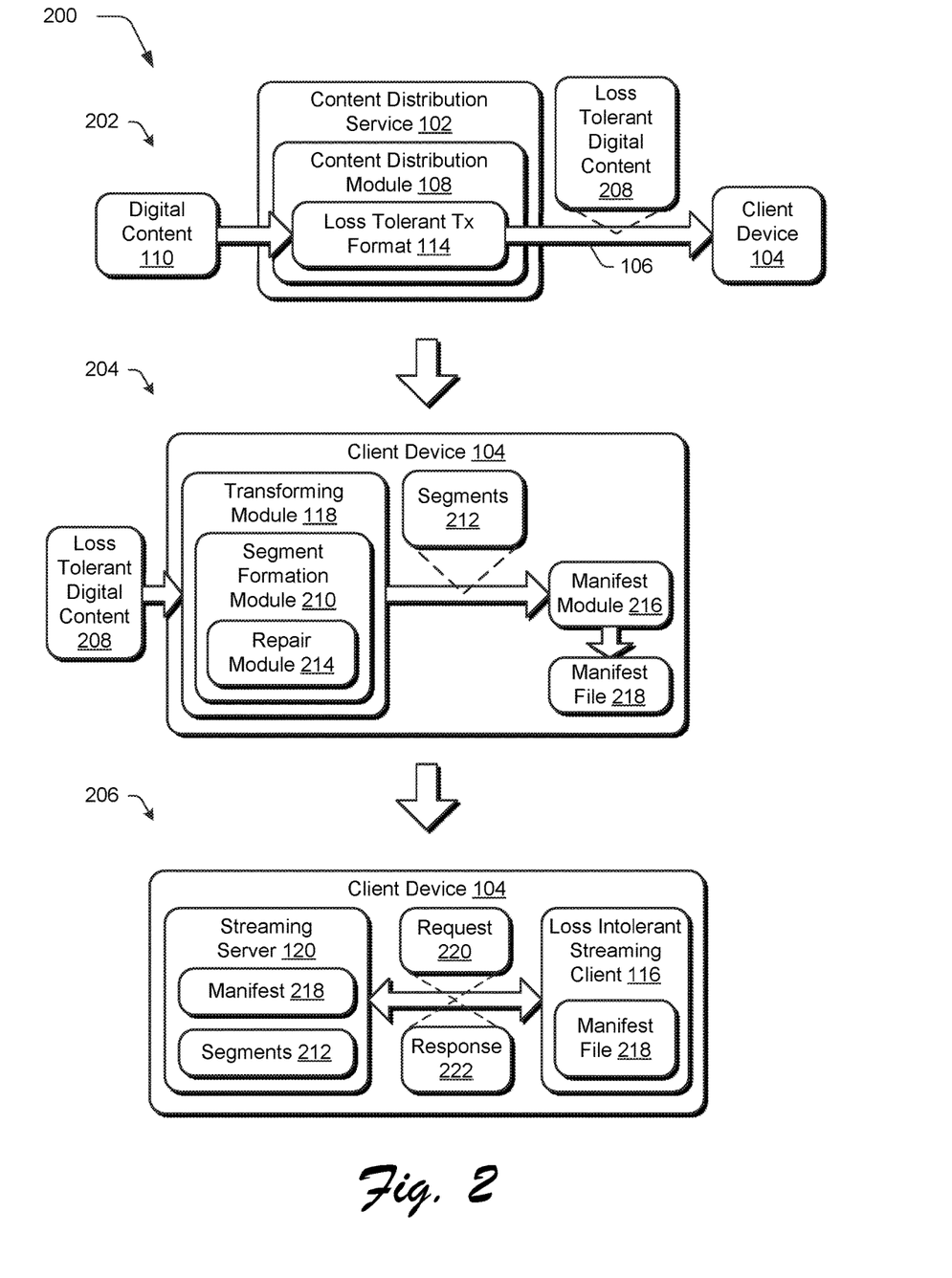
FIG. 2 depicts a system in an example implementation in which segments of a media file and a manifest are formed from loss tolerant digital content.
Figure 3:
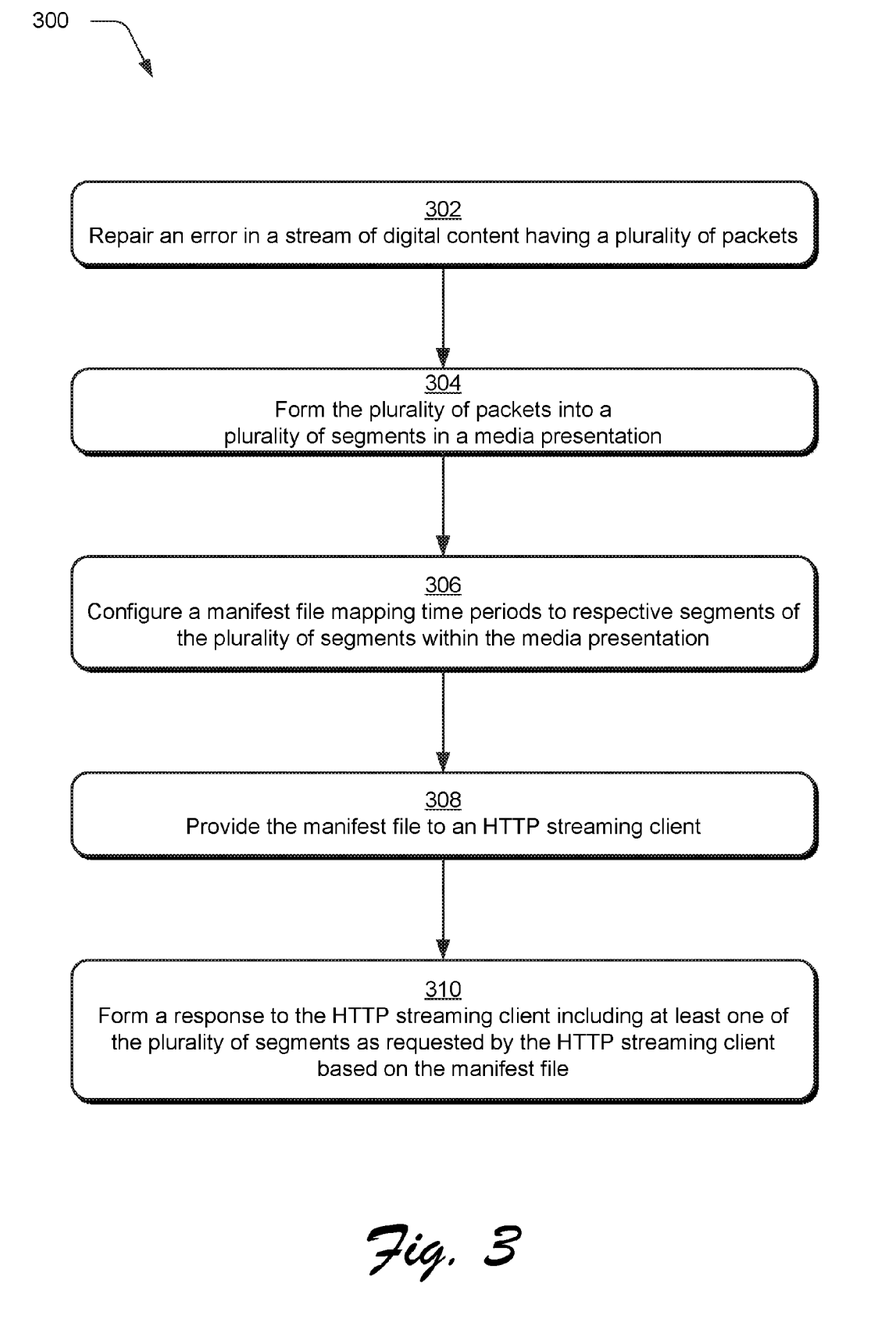
FIG. 3 is a flow diagram depicting a procedure in an example implementation in which a stream of digital content is formed which is suitable for consumption by loss intolerant streaming clients.

FIG. 2 depicts a system 200 in an example implementation in which segments of a media file and a manifest are formed from loss tolerant digital content. FIG. 3 depicts a procedure 300 in which a stream of digital content is formed which is suitable for consumption by loss intolerant streaming clients. The following discussion refers interchangeably to both figures.

The following discussion describes techniques that may be implemented utilizing the previously described systems and devices. Aspects of the procedures may be implemented in hardware, firmware, software, or a combination thereof. The procedure is shown as a set of blocks that specify operations performed by one or more devices and are not necessarily limited to the orders shown for performing the operations by the respective blocks.

FIG. 2 is illustrated using first, second, and third stages 202, 204, 206. At the first stage 202, digital content 110 is received at a content distribution service 102, such as a cable provider, satellite broadcaster, and so forth. The digital content 110 is then formed into loss tolerant digital content 208 in a loss tolerant transmission format 114. The content distribution module 108, for instance, may form the digital content 110 into packets that support use of resynchronization markers and frame boundary markers. In this example, the loss tolerant digital content 208 is streamed via the network 106 using a one-to-many unidirectional transmission medium that does not support backchannel communication, e.g., a multicast, satellite transmission, and so on. Other examples are also contemplated, however, that do support backchannel communication in order to perform error recovery by supporting requests for retransmission of missing or corrupted packets.

At the second stage 204, the client device 104 receives the loss tolerant digital content 208. The transforming module 118 includes a segment formation module 210 to form segments 212 from packets of the loss tolerant digital content 208. As part of this, the segment formation module 210 first employs a repair module 214 to repair errors in the stream of digital content having the plurality of packets (block 302), e.g., repair missing or corrupted packets. This ensures that segments 212 are formed "as expected" by loss intolerant streaming clients 116 and thus do not render the client inoperable. This includes use of techniques that support real time repair (e.g., use of null packets, padding, and so forth) to support rendering of live content as further described in relation to FIGS. 4-5.

The plurality of packets is formed into a plurality of segments in a media presentation (block 304). The segment formation module 210, for instance, may collect packets to form segments of a predefined length (e.g., a few seconds) as the loss tolerant digital content 208 is received, such as during a live broadcast. These segments 212 are then included as part of a media presentation. A manifest module 216 is then employed to form a manifest file 218 that is configured to map time periods to respective segments of the plurality of segments within the media presentation (block 306). The manifest file 218 and segments 212 in the media presentation are then usable to obtain desired segments of the digital content by the loss intolerant streaming clients 116.

At the third stage 206, for instance, the manifest file is provided to a loss intolerant streaming client 116, such as an HTTP streaming client (block 308). The loss intolerant streaming client 116 uses the manifest file 218 to locate a desired time period of the digital content 110 to be rendered, e.g., the most recent in a live broadcast, previous segments to support navigation back through the content, and so on. The desired time period is mapped to a corresponding segment through use of the manifest file 218, which is then used as part of a request 220 for that segment from the streaming server 120. The streaming server 120 forms a response that includes at least one of the plurality of segments 212 as requested by the HTTP streaming client based on the manifest file (block 310). In this way, the loss intolerant streaming client 116 (e.g., HTTP streaming client) may obtain whatever segments are desired. As previously described, loss intolerance of these clients may cause failure when confronted by errors (e.g., corruption, missing segments). Accordingly, the repair module 214 is configured to repair the segments at least to a degree to avoid failure, an example of which is described in the following and shown in corresponding figures.

Figure 4:
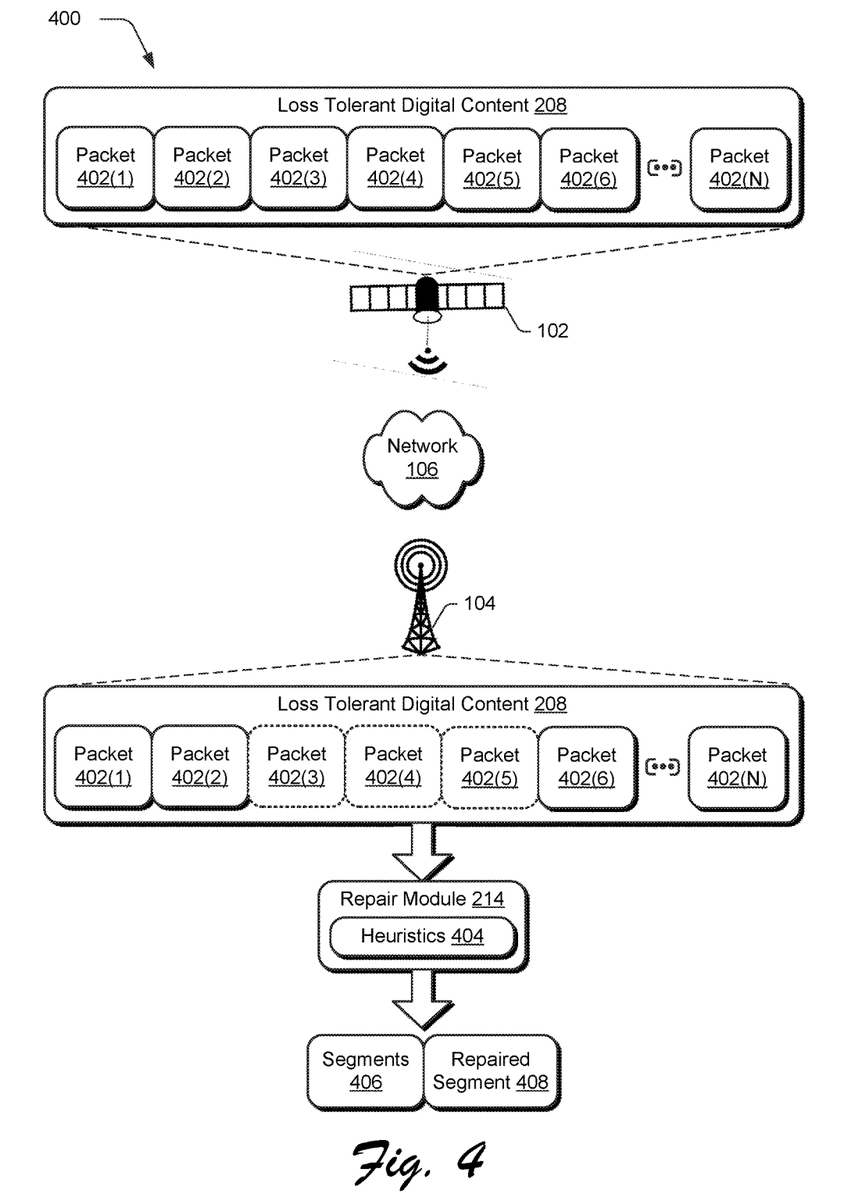
FIG. 4 depicts a system in an example implementation in which errors in digital content streamed via a network are repaired.
Figure 5:
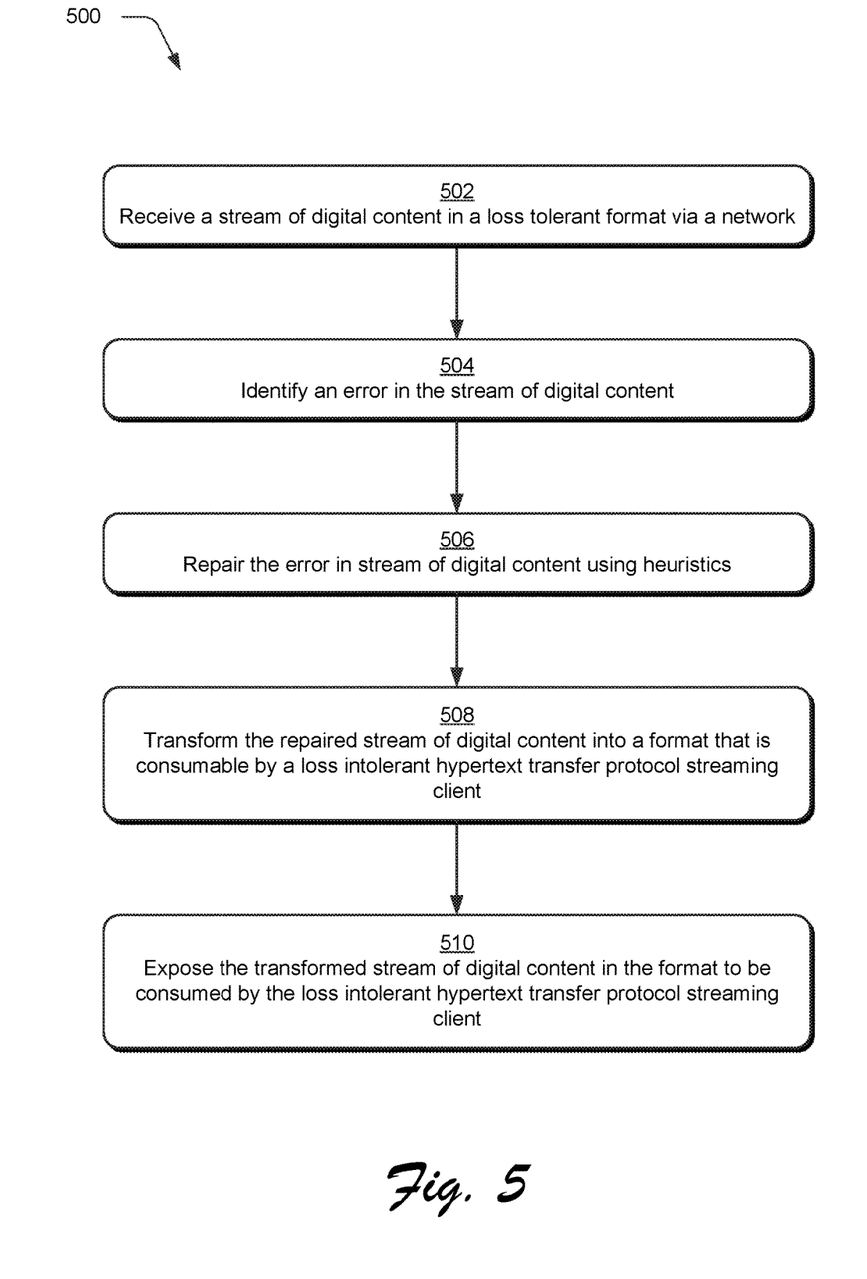
FIG. 5 is a flow diagram depicting a procedure in an example implementation in which heuristics are used to repair errors in a stream of digital content.

FIG. 4 depicts a system 400 in an example implementation in which errors in digital content streamed via the network 106 are repaired. FIG. 5 depicts a procedure 500 in which heuristics are used to repair errors in a stream of digital content. The following discussion refers interchangeably to both figures.

The following discussion describes techniques that may be implemented utilizing the previously described systems and devices. Aspects of the procedures may be implemented in hardware, firmware, software, or a combination thereof. The procedure is shown as a set of blocks that specify operations performed by one or more devices and are not necessarily limited to the orders shown for performing the operations by the respective blocks.

A stream of digital content is received in a loss tolerant format via a network (block 502). The client device 104, for instance, receives a stream of loss tolerant digital content 208 from the content distribution service 102 via the network 106. The loss tolerant digital content 208 is formed using a plurality of packets 402(1)-402(N) that are streamed via the network 106 using a loss tolerant format. An example of a loss tolerant format is an MPEG-2 Transport Stream.

An error is identified in the stream of digital content (block 504). Continuing with the previous example, the client device 104 receives the stream of loss tolerant digital content 208, which includes errors to packets 402(3)-402(5) as illustrated through phantom lines. The packets 402(3)-402(5), for instance, may be missing or corrupted and thus are not consumable to render the digital content, and so forth.

Accordingly, the error in the stream of digital content is repaired using heuristics 404 (block 506) by the repair module 214 of the client device 104. This is performed such that the digital content, when transformed into the format consumable by the loss intolerant clients, is "correct enough" such that even though an entirety of the digital content is not recovered through the repair, the repair is sufficient to enable the loss intolerant streaming client to remain operable.

For example, the repair module 214 may first decode as much of the stream of digital content as it can. The repair module 214 may then make repairs such that segments formed are structurally correct. To do so, the repair module 214 may pad packets to a known predetermined size to make up for missing portions based on the heuristics. The repair module 214 may also employ heuristics 404 to describe observed frame cadences for video or audio and insert blank or null frames where whole frame periods are missing to maintain playback cadence in streaming clients that are sensitive to missing frames. A null frame, for instance, may be configured as including silence for audio. For video encodings, a null frame may be implemented by repeating display of a frame buffer without an update, encoding a blank/black/gray frames, and so on. In predictive video encoding techniques, for instance, a previous frame may be updated after a missed update may be used instead of use of a new black or gray picture which may be visually disruptive.

The repaired stream of digital content is transformed into a format of a hypertext transfer protocol consumable by loss intolerant streaming clients (block 508). In this way, brief periods of excessive loss due to errors in transmission or communication do not render an entire multi-second segment unusable and may do so without use of a feedback channel. The transformed stream of digital content is exposed in the format to be consumed by a loss intolerant hypertext transfer protocol streaming client (block 510), such as through use of a request/reply technique as previously described in relation to FIGS. 2-3.

In one or more implementations, the repair module 214 is configured to make repairs in a first instance to provide the digital content in a timely manner, such as to support a live broadcast, through use of padding, null packets, and so on as described above. The repair module 214 may then employ recovery techniques, e.g., request retransmission and so forth, in an attempt to further recover the digital content. Once recovered, the repair module 214 forwards the recovered digital content to update the segments and manifest accordingly. In this way, time sensitive digital content may be received in a timely manner and further recovered for viewing in a more complete manner at a later time if so desired.

Example System and Device

FIG. 6 illustrates an example system generally at 600 that includes an example computing device 602 that is representative of one or more computing systems and/or devices that may implement the various techniques described herein. This is illustrated through inclusion of the transforming module 118, streaming server 120, and loss intolerant streaming client 116. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to stream digital content, a system comprising:
   a repair module implemented at least partially in hardware of a client device to repair an error in the stream of digital content using heuristics, the stream of digital content having a plurality of packets configured according to a loss tolerant format;
   a segment formation module implemented at least partially in hardware of the client device to form the repaired stream of digital content into a plurality of segments in a media presentation consumable by a loss intolerant hypertext transfer protocol (HTTP) streaming client implemented at least partially in hardware of the client device;
   a manifest module implemented at least partially in hardware of the client device to configure a manifest file mapping time periods to respective segments of the plurality of segments within the media presentation; and
   a streaming server implemented at least partially in hardware of the client device to provide the manifest file to the hypertext transfer protocol (HTTP) streaming client and form a response to a request executed by the HTTP streaming client, the request including at least one of the plurality of segments based on the manifest file.

2. The system as described in claim 1, wherein the loss tolerant format is configured in accordance with an MPEG-2 Transport Stream.

3. The system as described in claim 1, wherein the repair module is further configured to recover at least part of the error at a subsequent point in time, the segment formation module is configured to update the plurality of segments to incorporate the recovered part of the error, and the manifest module is configured to update the manifest to incorporate the updated plurality of segments.

4. The system as described in claim 1, wherein the error includes one or more missing packets in the stream of digital content in the loss tolerant format.

5. The system as described in claim 1, wherein the repair module is configured to perform the repair by padding packets to a predetermined size to form a respective said segment as defined by the heuristics.

6. The system as described in claim 1, wherein the repair module is configured to perform the repair by forming null frames to maintain a cadence of frames of the digital content as defined by the heuristics.

7. In a digital medium environment to communicate a stream of digital content, a method implemented by a computing device, the method comprising:
- repairing, by the computing device of a client device, an error in a stream of digital content having a plurality of packets using heuristics;
- forming, by the computing device of the client device, the repaired stream of digital content into a plurality of segments in a media presentation consumable by a hypertext transfer protocol (HTTP) streaming client included in the computing device of the client device;
- configuring, by the computing device of the client device, a manifest file that maps time periods to respective segments of the plurality of segments within the media presentation;
- providing, by the computing device of the client device, the manifest file to a hypertext transfer protocol (HTTP) streaming client; and
- forming, by the computing device of the client device, a response to a request by the HTTP streaming client, the request including at least one of the plurality of segments based on the manifest file.

8. The method as described in claim 7, wherein the error includes one or more missing packets in the stream of digital content in the loss tolerant format.

9. The method as described in claim 7, wherein the error includes a damaged packet in the stream of digital content.

10. The method as described in claim 7, wherein the repairing includes padding packets to a predetermined size as defined by the heuristics to form a respective said segment.

11. The method as described in claim 7, wherein the repairing includes forming null frames to maintain a cadence of frames of the digital content as defined by the heuristics.

12. In a digital medium environment to communicate a stream of digital content, a method implemented by a computing device, the method comprising:
- receiving, by the computing device of a client device, via a network the stream of digital content in a loss tolerant format;
- identifying, by the computing device of the client device, an error in the stream of digital content;
- repairing, by the computing device of the client device, the error in the stream of digital content using heuristics;
- transforming, by the computing device of the client device, the repaired stream of digital content into a format of a hypertext transfer protocol consumable by a loss intolerant streaming client included in the computing device of the client device; and
- exposing, by the computing device of the client device, the transformed stream of digital content in the format to be consumed by a loss intolerant hypertext transfer protocol (HTTP) streaming client.

13. The method as described in claim 12, wherein the loss tolerant format is configured in accordance with an MPEG-2 Transport Stream.

14. The method as described in claim 12, wherein the repairing is performed without use of a feedback channel to an originator of the stream of the digital content via the network.

15. The method as described in claim 12, wherein the transforming into the format of the hypertext transfer protocol consumable by loss intolerant clients includes forming a media presentation having a plurality of segments formed from packets of the repaired stream of digital content and a manifest file mapping time periods to respective said segments within the media presentation for retrieval by the loss intolerant hypertext transfer protocol (HTTP) streaming client.

16. The method as described in claim 12, wherein the error includes one or more missing packets in the stream of digital content in the loss tolerant format.

17. The method as described in claim 12, wherein the repairing includes padding packets to a predetermined size to form a respective said segment as defined by the heuristics.

18. The method as described in claim 12, wherein the repairing includes forming null frames to maintain a cadence of frames of the digital content as defined by the heuristics.

19. The method as described in claim 12, wherein the repairing maintains the stream of digital content in the loss tolerant format.

20. The method as described in claim 12, further comprising rendering the said transformed stream of digital content by the loss intolerant hypertext transfer protocol (HTTP) streaming client.

* * * * *